Figure 1:
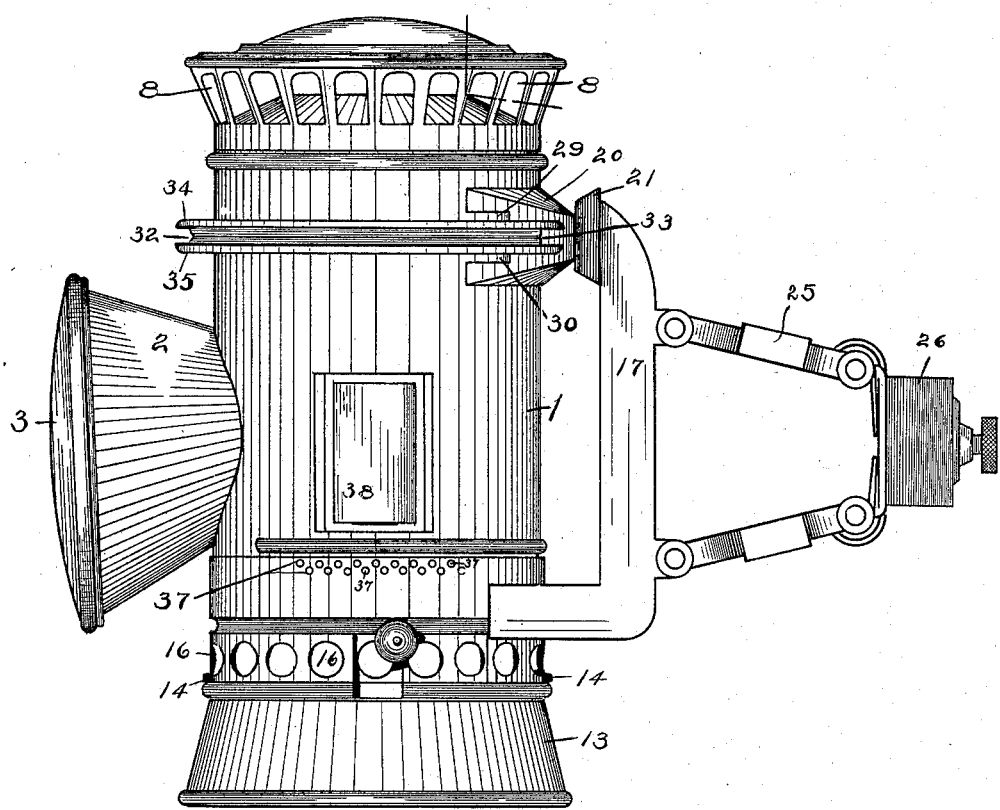

No. 609,222.  
C. BERGENER.  
BICYCLE LAMP.  
(Application filed Sept. 5, 1896.)

Patented Aug. 16, 1898.

(No Model.)

3 Sheets—Sheet 1.

Witnesses.

Inventor.  
Charles Bergener  
Attorneys

No. 609,222. Patented Aug. 16, 1898.
C. BERGENER.
BICYCLE LAMP.
(Application filed Sept. 5, 1896.)
(No Model.) 3 Sheets—Sheet 2.
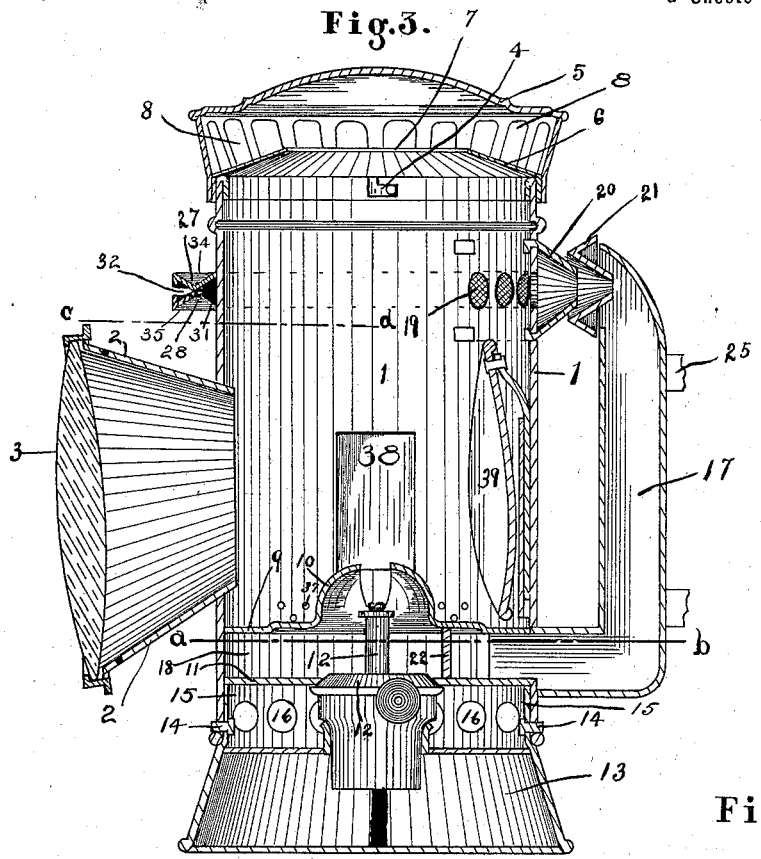
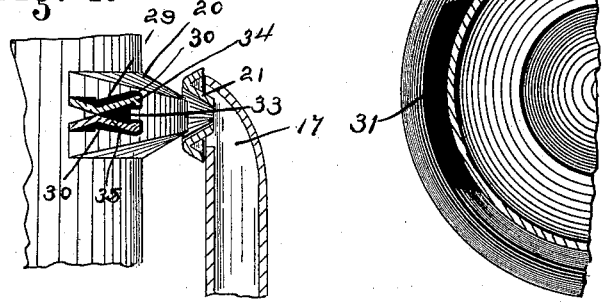
Witnesses. Inventor.
Charles Bergener
Attorneys No. 609,222. Patented Aug. 16, 1898.
C. BERGENER.
BICYCLE LAMP.
(Application filed Sept. 5, 1896.)

(No Model.) 3 Sheets—Sheet 3.

Witnesses. Inventor.
G. Willard Rich. Charles Bergener
Wallace Murdock by Church & Church
his Attorneys

UNITED STATES PATENT OFFICE.

CHARLES BERGENER, OF ROCHESTER, NEW YORK, ASSIGNOR TO THE C. T. HAM MANUFACTURING COMPANY, OF SAME PLACE.

BICYCLE-LAMP.

SPECIFICATION forming part of Letters Patent No. 609,222, dated August 16, 1898.

Application filed September 5, 1896. Serial No. 604,996. (No model.) Patented in England December 15, 1896, No. 28,684, and in France April 17, 1897, No. 262,247.

*To all whom it may concern:*

Be it known that I, CHARLES BERGENER, of Rochester, in the county of Monroe and State of New York, have invented certain new and useful Improvements in Bicycle-Lamps; and I do hereby declare the following to be a full, clear, and exact description of the same, reference being had to the accompanying drawings, forming a part of this specification, and to the reference-numerals marked thereon.

The subject-matter of this application is contained in British Letters Patent No. 28,684, dated December 15, 1896, and also in French Patent No. 262,247, dated April 17, 1897.

My present invention has for its object to provide an improved lamp or lantern particularly adapted for use on bicycles or vehicles, and has for its object to provide an improved construction whereby a sufficient quantity of air to support combustion will be supplied, and the lamp is not liable to be extinguished either by jars to which it may be subjected or by reason of gusts of air or the blasts incident to its rapid movement.

Heretofore attempts have been made to construct a small tubular lamp or lantern particularly adapted for bicyclists' use, because such lamps and lanterns are best adapted to withstand shocks and gusts of wind without being extinguished; but such attempts have not been commercially successful for the reason, among others, that it is exceedingly difficult to make a small, symmetrical, and sightly structure of this kind without sacrificing some of the advantageous features of tubular lanterns, unduly heating the air-tubes, and reversing the air-current supplying the flame, or impairing the ability to withstand gusts of wind from all directions (as when the lamp is still) when arranging the parts for the proper burning when the lamp is moved in one direction at speed. My present structure, however, overcomes all the objections noted and others and fulfils all the requirements of a perfect lamp adapted for bicyclists' use; and it consists in certain improvements which will be hereinafter described, and the novel features pointed out in the claims at the end of this specification.

Figure 2:
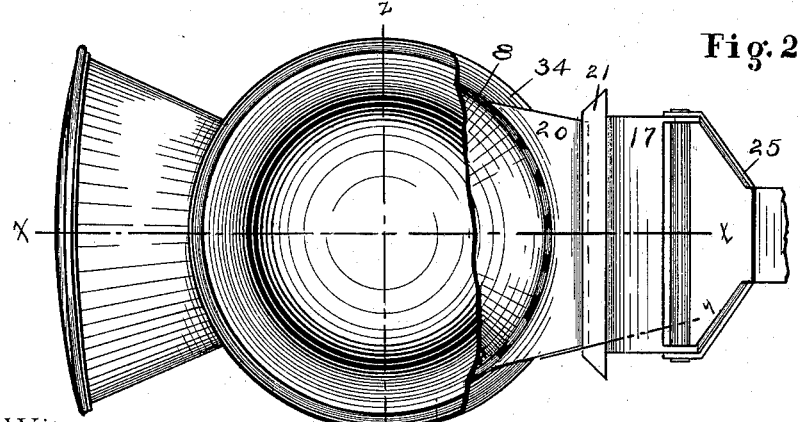
Figure 5:
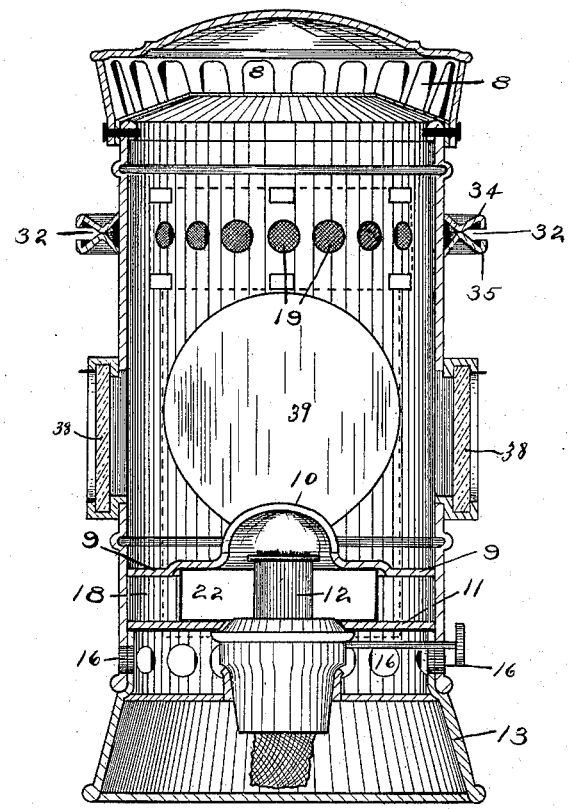
Figure 6:
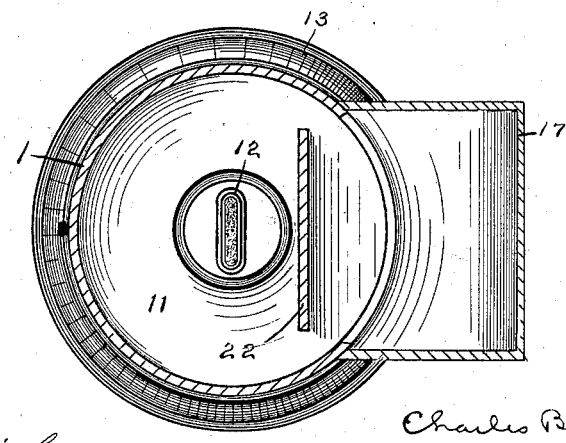

In the drawings, Figure 1 is a side elevation of a lamp constructed in accordance with my invention, showing means for attaching it to a bicycle; Fig. 2, a plan view of the same with the rear portion of the top or hood partly broken away; Fig. 3, a vertical sectional view on the line $x\ x$ of Fig. 2; Fig. 4, a similar view on the line $y\ y$ of Fig. 2; Fig. 5, a vertical sectional view on the line $z\ z$ of Fig. 2; Fig. 6, a horizontal sectional view on the line $a\ b$ of Fig. 3, and Fig. 7 a sectional view on the line $c\ d$ of Fig. 3 looking upward.

Similar reference-numerals in the several figures indicate similar parts.

The body 1 of the lamp is preferably cylindrical in form and provided at the front with a goggle 2, carrying a lens 3 or a glass window of any construction. The upper end of the body is provided with a removable cap or cover secured in position by a bayonet-joint, as 4, and embodying an upper cap 5 and a plate 6 beneath it, preferably inclined and provided with a central aperture 7 to permit the exit of the heated air and products which find their exit through suitable apertures 8 at the sides of the cap 5, the particular structure of this cap not being essential excepting that it permits the exit of the heated products and prevents the direct passage of gusts of air down into the body of the lamp. The lower end of the body 1 is provided with a plate 9, preferably secured rigidly in position and connected to or forming part of the burner-cone 10, and beneath this plate is another plate 11, forming the bottom of the air-chamber 18 and having a central aperture with which the upper part of the wick-tube 12 of the burner coöperates, making a tight joint. The burner is of the ordinary slip variety, such as used in tubular lanterns, and is mounted loosely in the central aperture in a removable oil-fount 13, detachably secured to the bottom of the body by any suitably fastening, such as a bayonet-joint embodying the pins 14, coöperating with suitable angular slots formed in the bottom of the tubular body.

Secured to the upper portion of the oil-fount is an annular flange 15, having apertures 16, adapted when the oil-fount is secured to the body to coöperate with corresponding apertures formed in the lower portion thereof, so as to permit a free circulation of air between the top of the oil-fount and the plate 11 to keep the fount cool.

It will be noted that the oil-fount is not only separated from the lamp-body by an air-space, but the end of the burner is introduced into the air-chamber, and, as will be explained, there are no joints in the air-circulating tubes or chambers necessary to be kept tight.

On the rear side of the lamp-body and separated therefrom is arranged a broad flat air-tube 17, communicating at its lower end with the air-chamber 18 between the plates 9 and 11, and at its upper end is a horizontally-arranged air-injector composed in the present arrangement of sections 20 and 21, preferably arranged between the upper end of the tube 17 and the apertures 19 in the body, as shown particularly in Figs. 3 and 4, this injector causing a supply of fresh air to enter the tube 17 and thence pass to the air-chamber 18 beneath the burner-cone, no matter from which direction the wind may blow, a portion of the heated air and products within the body of the lamp being in the present arrangement drawn through the apertures 19 in the upper part of the body, this connection serving to balance the currents and prevent the extinguishment of the lamp.

A deflecting-plate 22 is arranged in the chamber 18 in front of the entrance of the tube 17, as shown in Figs. 3 and 6, to distribute the air in the air-chamber and prevent a direct blast upon the flame, and a series of apertures 37 are arranged in the body above the burner-cone to admit air to the interior of the lamp.

The tube and air-injector are located at the rear of the lamp, and the former serves as a means for connecting the supporting-arms 25 with the bracket 26, which parts may be of any suitable construction, the connection being preferably an elastic one.

In order that the forward movement of the bicycle may not cause too great a supply of air through the tube (the injector, in the present embodiment, being narrower than the lamp-body) and the requisite amount of fresh air may be supplied to the tube when the lamp is moved vertically or subjected to vertical air-currents, I arrange upon the upper part of the body, and preferably in line with the injector, devices for receiving air and supplying it to the tube in sufficient quantity to support combustion and cause the flame to burn brightly, but so constructed that the flame will not be extinguished. In the present embodiment this air-directing device is in annular form extending around the lamp-body, preferably on a line with the injector, the upper and lower sides having open grooves or channels 27 and 28, which communicate with the tube 17 through apertures 29 and 30 in the sides of the inner injector-section, as in Fig. 4, and an annular chamber or passage 31 open at the front of the lamp for conducting air into the tube 17. (See Fig. 7.)

Between the upper and lower channels 27 and 28 the air-directing device is provided with the annular channel or passage 32, having overhanging edges, which passage communicates with the air-tube 17 through apertures 33, as in Fig. 4, and while these apertures 33 are desirable, affording a better air-supply, I do not regard them as essential. These air channels and passages are formed by two annular plates 34 and 35, which are similar in construction, but reversed in position and secured to the lamp-body, with the downwardly-extending edges projecting in proximity, and the inner flange of the lower plate 35 is cut away at the front of the lamp, preferably over the lens-goggle, as in Fig. 7, for the purpose of permitting air to enter the tube in sufficient quantity to supply the flame when the lamp is moving forward without extinguishing it.

While I do not wish to confine my invention in any way by a statement of theory, I believe that the downward movement of the lamp causes air striking the lower plate 35 to be fed through apertures 30 into the injector, as well as through the space between the injector-sections, and also upon the upward movement of the lamp the plate 34 will cause the injection of air to the tube through the apertures 30, and the injector will supply air to the tube whether coming from the front or rear.

The lamp-body is provided with the usual signal-windows 38 at the sides, one or both of which may be movable to permit the lighting of the wick, and a suitable removable reflector 39 is provided in the rear of the burner for throwing the rays forward.

By separating the tube 17 from the body of the lamp, as shown, there is no danger of its being unduly heated, thereby reversing the supply-current of air, and, further, it provides not only a handle, but an efficient means for the attachment of the supporting-arms.

I find by repeated tests that the lamp herein shown cannot be extinguished by any jarring to which it is liable to be subjected and that the air-currents are so balanced that it will not be extinguished by high winds or when moving at great speed.

I do not claim herein the construction of the oil-pot and the means connecting it with the body nor the annular air-director, as these are claimed in my pending application, Serial No. 611,385, filed November 6, 1896.

I claim as my invention—

1. In a lamp, the combination with the body having the window at the front, the air-chamber at the bottom, the burner-cone and the burner, of the single air-tube at the rear of the body separated therefrom and communicating with the interior of the body above the cone and also with the air-chamber and the horizontally-extending air-injector at the upper portion of said tube, substantially as described.

2. In a lamp, the combination with the body having the window at the front, the air-chamber in the bottom and the burner-cone above the air-chamber, of the air-tube at the rear of the body, connecting with said air-chamber, the injector at the top of the tube, and an air-director on the body having the open upper and lower channels or passages connecting with the upper portion of the air-tube, substantially as described.

3. In a lamp, the combination with the body having the window at the front, the air-chamber at the bottom and the burner-cone, of the air-tube at the rear of the body communicating with the air-chamber at its lower end and with the body of the lamp above the burner, the air-injector at the upper portion of said tube, an air-director on the body having the open upper and lower air-channels communicating with the air-tube, substantially as described.

4. In a lamp, the combination with the body having the window at the front, the air-chamber at the bottom and the burner-cone forming part of said chamber, of the air-tube at the rear of the body communicating with the air-chamber at its lower end, the air-injector at the upper portion of the tube, an air-director on the body having the open upper and lower air-channels communicating with the air-tube and an intermediate open air-channel having the overhanging edges and also opening into the air-tube at the rear of the lamp, substantially as described.

5. In a lamp, the combination with the body having the window at the front, the air-chamber at the bottom and the burner-cone forming part of said air-chamber, of the air-tube at the rear of the body communicating with the air-chamber at its lower end, the air-injector at the upper portion of the tube, an air-director on the body having the open upper and lower air-channels communicating with the air-tube, and the annular air-passage open at the front, and communicating with the air-tube, substantially as described.

6. In a lamp, the combination with the body having the air-chamber at the bottom, the air-tube at the rear communicating with the air-chamber and having the injector at its upper portion, of the annular air-director having the open air-channels at top and bottom communicating with the air-tube, the intermediate open air-channel and having the overhanging edges, and the annular air-passage open at the front and communicating at the rear with the air-tube, substantially as described.

7. In a lamp, the combination with the body having the window at the front, the air-chamber at the bottom and the burner-cone, of the air-tube at the rear of the body communicating with the body of the lamp above the burner and also with the air-chamber, an air-injector at the upper end of said tube and the annular air-director on the body composed of the plates 34 and 35, arranged and operating substantially as described.

CHARLES BERGENER.

Witnesses:
F. F. CHURCH,
G. A. RODA.